US009218792B2

(12) United States Patent
Dutta et al.

(10) Patent No.: US 9,218,792 B2
(45) Date of Patent: Dec. 22, 2015

(54) VARIABLE SCALING OF IMAGE DATA FOR ASPECT RATIO CONVERSION

(75) Inventors: Santanu Dutta, Sunnyvale, CA (US); Donglei Yuan, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1199 days.

(21) Appl. No.: 12/332,676

(22) Filed: Dec. 11, 2008

(65) Prior Publication Data

US 2010/0149216 A1    Jun. 17, 2010

(51) Int. Cl.
| G09G 5/00 | (2006.01) |
| H04N 7/01 | (2006.01) |
| H04N 11/20 | (2006.01) |
| G06F 3/00 | (2006.01) |
| G06F 3/048 | (2013.01) |
| G06T 1/00 | (2006.01) |
| G09G 5/36 | (2006.01) |

(52) U.S. Cl.
CPC .. *G09G 5/36* (2013.01); *G06T 1/00* (2013.01); *H04N 7/0122* (2013.01); *G09G 2340/0407* (2013.01); *G09G 2340/0442* (2013.01)

(58) Field of Classification Search
None
See application file for complete search history.

(56) References Cited

U.S. PATENT DOCUMENTS

| 5,534,934 A | 7/1996 | Katsumata et al. |
| 5,537,149 A | 7/1996 | Teraoka et al. |
| 5,953,691 A | 9/1999 | Mills |
| 6,538,658 B1 | 3/2003 | Herrera |
| 6,757,022 B2 | 6/2004 | Wredenhagen et al. |
| 6,825,851 B1 | 11/2004 | Leather |
| 6,828,987 B2 | 12/2004 | Swan |
| 6,868,189 B1 | 3/2005 | Hoshino |
| 6,933,954 B2 | 8/2005 | Senior et al. |
| 6,958,780 B1 | 10/2005 | Kawai |
| 6,970,204 B1 | 11/2005 | Aida et al. |
| 7,317,827 B2 | 1/2008 | Munsil |
| 7,511,714 B1 | 3/2009 | Amann et al. |
| 2002/0145610 A1 | 10/2002 | Barilovits et al. |
| 2003/0001868 A1* | 1/2003 | Sack et al. ............... 345/660 |
| 2003/0030653 A1 | 2/2003 | Swan |
| 2003/0189581 A1 | 10/2003 | Nasoff et al. |
| 2003/0201994 A1 | 10/2003 | Taylor et al. |
| 2003/0234795 A1 | 12/2003 | Lee |
| 2004/0075671 A1* | 4/2004 | Vale et al. ............... 345/660 |

(Continued)

FOREIGN PATENT DOCUMENTS

| CN | 101197957 | 6/2008 |
| JP | H03089678 | 4/1991 |

(Continued)

*Primary Examiner* — Maurice L McDowell, Jr.
*Assistant Examiner* — Donna J Ricks (57) ABSTRACT

A mechanism for enabling a user to vary the scale or zoom of image data for aspect ratio conversion using a graphical user interface is disclosed. A user may move a selector of the graphical user interface to one end for selecting a linear scaling, to the other end for selecting a parabolic scaling or in between for selecting a scaling associated with another function, thereby enabling a user to vary the magnitude of the scaling across the image data. A parametric function with a single parameter may be used to scale the image data, where the movement of the selector may change the parameter and consequently vary the scaling of the image data. In this manner, a user may efficiently vary or select the scaling of the image data using a graphical user interface to reduce objectionable distortion associated with changing the aspect ratio of the image data.

30 Claims, 7 Drawing Sheets

(56) References Cited

U.S. PATENT DOCUMENTS

| | | |
|---|---|---|
| 2004/0119886 A1 | 6/2004 | Cook et al. |
| 2004/0145595 A1* | 7/2004 | Bennett .......................... 345/660 |
| 2004/0246257 A1 | 12/2004 | MacInnis et al. |
| 2005/0063586 A1 | 3/2005 | Munsil et al. |
| 2006/0164441 A1* | 7/2006 | Wada et al. ................... 345/649 |
| 2007/0070083 A1 | 3/2007 | Fouladi et al. |
| 2007/0097261 A1* | 5/2007 | Smith et al. ................... 348/445 |
| 2007/0132788 A1* | 6/2007 | Heo .............................. 345/660 |
| 2007/0195194 A1 | 8/2007 | Op De Beeck |
| 2007/0198941 A1* | 8/2007 | Baar et al. ..................... 715/764 |
| 2008/0012880 A1* | 1/2008 | Plut .............................. 345/660 |

FOREIGN PATENT DOCUMENTS

| | | |
|---|---|---|
| JP | 2002064760 | 2/2002 |
| JP | 2003189266 | 7/2003 |
| JP | 2005333380 | 12/2005 |
| JP | 2006135410 | 5/2006 |
| JP | 2007124232 | 5/2007 |
| JP | 2007129728 | 5/2007 |
| JP | 2008122800 | 5/2008 |
| JP | 2009162947 | 7/2009 |
| KR | 10-2006-0005578 | 1/2006 |
| KR | 20060005578 A | 1/2006 |
| KR | 10-2008-0012609 | 2/2008 |
| KR | 20080012609 A | 2/2008 |

* cited by examiner

VARIABLE SCALING OF IMAGE DATA FOR ASPECT RATIO CONVERSION

BACKGROUND OF THE INVENTION

Content is often displayed on devices using an aspect ratio (e.g., the ratio of the width to the height of the image) which is different than the aspect ratio of the source video. For example, 4:3 standard definition video is commonly displayed on high definition displays using a 16:9 aspect ratio. Similarly, 16:9 high definition video is commonly displayed on standard definition displays using a 4:3 aspect ratio. In such cases, aspect ratio conversion must be performed on the source video before display.

A first conventional solution for aspect ratio conversion involves scaling the source video and placing black bars on the sides or top and bottom of the scaled source video. Placing black bars on the sides of the scaled source video is commonly referred to as "pillarbox" and is used when the aspect ratio of the source video is smaller than the aspect ratio of the destination display. Placing black bars on the top and bottom of the source video is commonly referred to as "letterbox" and is used when the aspect ratio of the source video is larger than the aspect ratio of the destination display. Linear scaling, e.g., using a constant scale across the image in the horizontal direction or vertical direction, is often used to scale the source video prior to application of the black bars. Although this first conventional solution does not distort the source video, it is less desirable than other solutions since portions of the destination display (e.g., displaying the black bars) are not used and because the black bars are objectionable to some viewers.

A second conventional solution involves scaling the source video and cropping either the top and bottom of the scaled source video (e.g., when the aspect ratio of the source video is smaller than the aspect ratio of the destination display) or the sides of the source video (e.g., when the aspect ratio of the source video is larger than the aspect ratio of the destination display). In this case, the source video is scaled (e.g., enlarged or reduced) in both the horizontal and vertical directions to maintain the aspect ratio before cropping the scaled image to fit the aspect ratio of the destination display. Linear scaling is often used to scale the source video.

Although the second conventional solution utilizes more of the destination display than the first conventional solution by not applying black bars to the source video, content is lost by cropping the image. Accordingly, the second conventional solution offers a less desirable user experience since less content is displayed for viewing by a user.

A third conventional solution for aspect ratio conversion involves using linear scaling to scale the source video to fit the destination display without the use of black bars. Although the third conventional solution does not involve cropping content like the second conventional solution, the source video is distorted by the scaling of the image performed to obviate the need for the black bars. The distortion is often unacceptable to users, and therefore, provides a poor viewing experience in certain situations.

A fourth conventional solution for aspect ratio conversion involves using "parabolic scaling" to scale the source video to fit the destination display without the use of black bars. Parabolic scaling involves the use of a scaling magnitude which varies as a parabolic function across the image, where there is zero scaling at the center of the image. Accordingly, parabolic scaling distorts (e.g., squeezes or stretches) the edges of the source video more than the center of the source video (e.g., with no or little scaling). Therefore, the distortion caused by the parabolic scaling may be objectionable where important content is present near the sides of the source video, and thus, provides a poor viewing experience in certain situations.

SUMMARY OF THE INVENTION

Accordingly, a need exists for an aspect ratio conversion solution which improves the viewing experience without cropping portions of the image content. A need also exists for an improved scaling solution which reduces objectionable distortion in the image during aspect ratio conversion. Additionally, a need exists for a solution which enables a user to vary the scaling of an image used with aspect ratio conversion of the image. Embodiments of the present invention provide novel solutions to these needs and others as described below.

Embodiments of the present invention are directed to a mechanism for enabling a user to vary the scale or zoom of image data for aspect ratio conversion using a graphical user interface. For example, a user may move a selector of the graphical user interface to one end for selecting a linear scaling, to the other end for selecting a parabolic scaling or in between for selecting a scaling associated with another function, thereby enabling a user to vary the magnitude of the scaling across the image data. A parametric function with a single parameter may be used to scale the image data, where the movement of the selector may change the parameter and consequently vary the scaling of the image data. In this manner, a user may efficiently vary or select the scaling of the image data using a graphical user interface to reduce objectionable distortion associated with changing the aspect ratio of the image data.

In one embodiment, a method of scaling image data includes displaying on a display screen a graphical user interface for enabling a user to select a selected variable scaling value from a plurality of variable scaling values, the selected variable scaling value for scaling first image data. In response to a user selection of the selected variable scaling value using the graphical user interface, the first image data is scaled based on the selected variable scaling value to generate second image data, wherein the scaling the first image data includes scaling a first portion of the first image data using a first scale and a second portion of the first image data using a second scale, wherein the first and second scales are different and a function of the selected variable scaling value. The second image data is rendered on the display screen. Additionally, the scaling the first image data may include generating the second image data using a parametric function, the parametric function relating the first image data and the second image data with a single parameter, and wherein the single parameter in set equal to the selected variable scaling value. Further, the first image data may be associated with a first aspect ratio, the second image data may be associated with a second aspect ratio, and wherein the first and second aspect ratios may be different.

In another embodiment, a graphical user interface for enabling variable scaling of image data includes a plurality of user-selectable graphical objects, wherein each of the plurality of user-selectable graphical objects is associated with a respective variable scaling value for scaling first image data, the first image data for display on a display screen, and wherein the first image data includes a first portion and a second portion. A user selection of a selected user-selectable graphical object from the plurality of user-selectable graphical objects is operable to initiate a scaling of the first image data to generate second image data, wherein the scaling of the first image data is performed in accordance with a selected variable scaling value associated with the selected user-selectable graphical object, wherein the scaling of the first image data further includes scaling the first portion of the first image data using a first scale and scaling the second portion of the first image data using a second scale, and wherein the scaling of the first image data includes scaling a portion of image data located in the center of the first image data.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "configuring," "converting," "creating," "debugging," "defining," "delivering," "depicting," "detecting," "determining," "displaying," "establishing," "executing," "forwarding," "flipping," "generating," "grouping," "hiding," "identifying," "initiating," "instantiating," "interacting," "modifying," "monitoring," "moving," "outputting," "parsing," "performing," "placing," "presenting," "processing," "programming," "querying," "removing," "rendering," "repeating," "resuming," "sampling," "simulating," "sorting," "storing," "sub-sampling," "scaling," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

Embodiments of the present invention are directed to a mechanism for enabling a user to vary the scale or zoom of image (e.g., a video, an image, etc.) for aspect ratio conversion using a graphical user interface. For example, a user may move a slider or selector (e.g., 150) of the graphical user interface (e.g., 140) to one end for selecting a linear scaling (e.g., associated with position 152 of FIG. 1 and graph 430 of FIG. 4), to the other end for selecting a parabolic scaling (e.g., associated with position 154 of FIG. 1 and graph 440 of FIG. 4) or in between for selecting a scaling associated with another function (e.g., associated with position 156 of FIG. 1 and graph 450 of FIG. 4), thereby enabling a user to vary the magnitude of the scaling across the image. A parametric function with a single parameter may be used to scale the image, where the movement of the selector may change the parameter and consequently vary the scaling of the image. In this manner, a user may efficiently vary or select the scaling of the image using a graphical user interface (e.g., selector 150 of graphical user interface 140) to reduce objectionable distortion associated with changing the aspect ratio of the image.

It should be appreciated that the term "image" or "image data" as used herein may mean any content or data which may be rendered for viewing by a user. For example, image data (e.g., 110, 120, etc.) may be a frame from a video, a portion of a frame from a video, a still image, a portion of a still image, etc.

Figure 1:
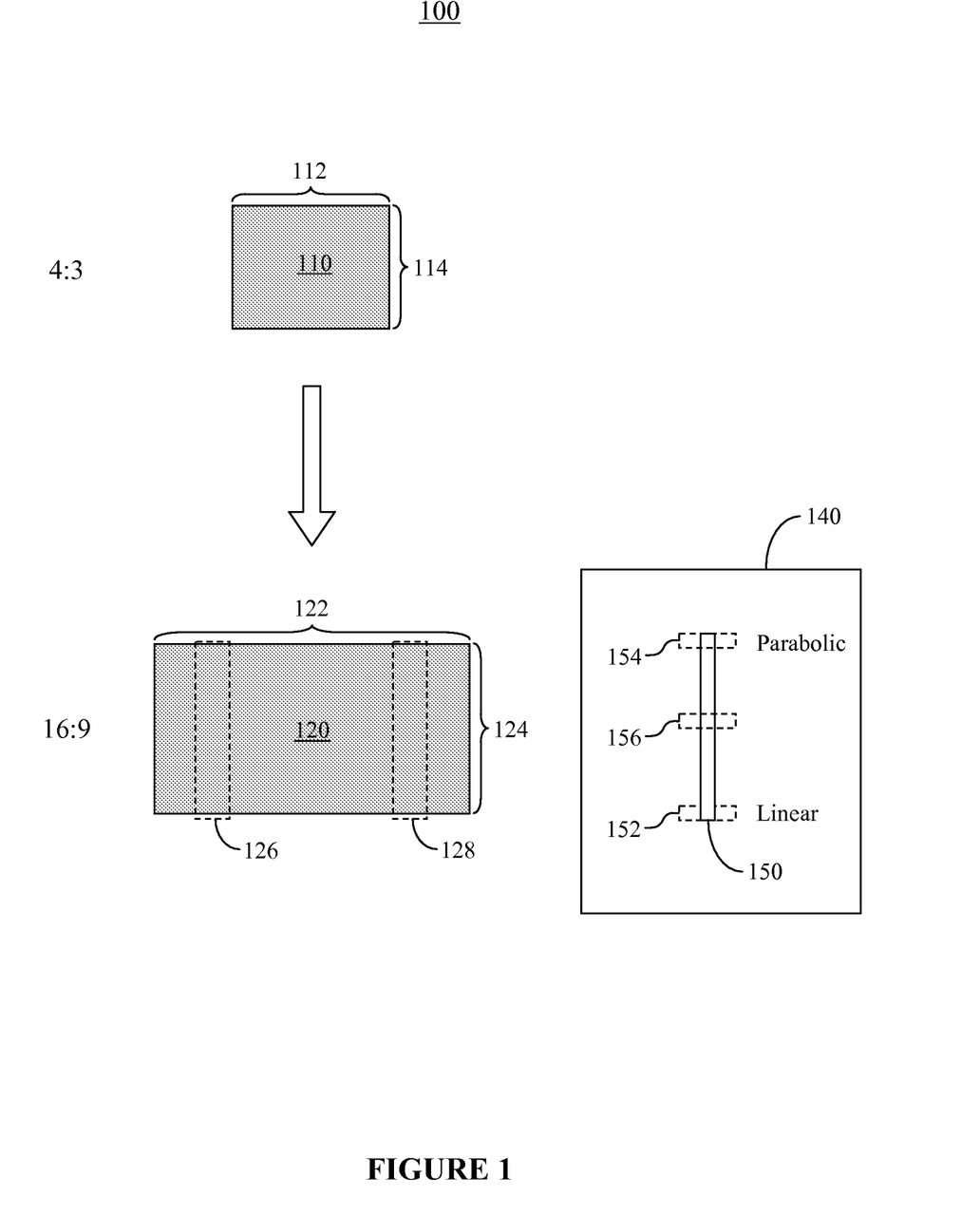
FIG. 1 shows an exemplary diagram for varying the scaling or zooming of image data in accordance with one embodiment of the present invention.

FIG. 1 shows exemplary diagram 100 for varying the scaling or zooming of image data in accordance with one embodiment of the present invention. As shown in FIG. 1, the aspect ratio of image data (e.g., source image data) 110 may be converted by performing a scaling of image data 110 in at least one dimension, where scaling of image data 110 may generate image data (e.g., scaled image data or destination image data) 120 with an aspect ratio (e.g., 16:9) which is different from that of image data 110 (e.g., with an aspect ratio of 4:3). The aspect ratio of image data 110 may be determined as a ratio of width 112 to height 114, whereas the aspect ratio of image data 120 may be determined as a ratio of width 122 to height 124. Additionally, image data 120 may be rendered (e.g., displayed on a display screen) for viewing by a user. Further, image data 120 may be generated using linear scaling (e.g. where the magnitude of the scale does not vary or varies a small amount across image data 120), parabolic scaling (e.g., where the magnitude of the scale varies as a parabola across image data 120 with no scaling at the center of image data 120), or scaling associated with another function (e.g., another parametric function such as a parabola with some scaling at the center of image data 120, a non-linear parametric function, a non-parabolic parametric function, etc.).

The type of scaling applied to the image data (e.g., 110) may be selected or varied using a graphical user interface (GUI) in one embodiment. For example, GUI 140 may include selector 150 for varying the scaling of image 110, where each position of selector 150 may be associated with a different scaling type (e.g., linear, parabolic, a scaling associated with another function, etc.). More specifically, movement of selector 150 to position 152 may implement a linear scaling of image data 110, movement of selector 150 to position 154 may implement a parabolic scaling of image data 110, and movement of selector 150 to a position between positions 152 and 154 may implement a scaling (e.g., of image data 110) associated with another function. Accordingly, a user may advantageously vary how the magnitude of the scale varies across the image data (e.g., by changing the position of selector 150) and further vary the magnitude of the scaling of one or more portions (e.g., 126, 128, etc.) of the image data (e.g., 120), thereby enabling a user to adjust the distortion of the rendered image (e.g., generated by rendering image data 120) to improve or change the viewing experience.

Although scaling of image data 110 to generate image data 120 may involve positive scaling or scaling up the image data (e.g., stretching the image data in at least one dimension during an aspect ratio conversion from, for example, 4:3 to 16:9), it should be appreciated that image data 110 may be negative scaled or scaled down (e.g., squeezed in at least one dimension) in one embodiment. For example, image data 110 may have an aspect ratio of 16:9 and image data 120 may have an aspect ratio of 4:3 in one embodiment, and thus, a scaling of image data 110 to generate image data 120 may involve a scaling down (e.g., from an aspect ratio of 16:9 to 4:3) of the image data. Additionally, the types of scalings (e.g., linear, parabolic, scalings associated with another parametric function, etc.) used when scaling down image data may be similar to that used when scaling up an image.

Figure 2:
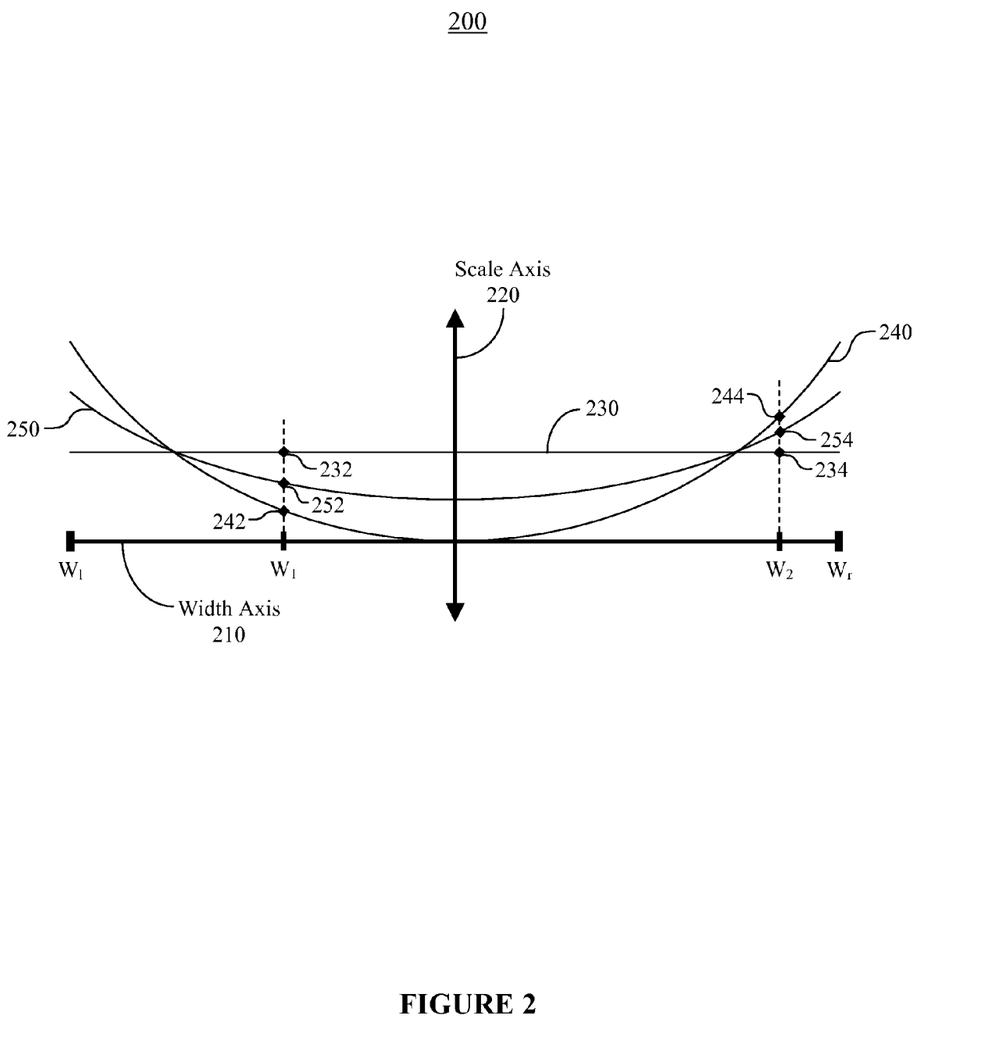
FIG. 2 shows an exemplary graph of exemplary scalings for image data in accordance with one embodiment of the present invention.

FIG. 2 shows exemplary graph 200 of exemplary scalings for image data in accordance with one embodiment of the present invention. As shown in FIG. 2, width axis 210 may represent the width of image data (e.g., where $W_l$ corresponds to the left side of the image data and $W_r$ corresponds to the right side of the image data), where the units for width axis 210 may be pixels, lines, some combination thereof, etc. Scale axis 220 may represent the magnitude of the scaling of image data at one or more points along width axis 210. Accordingly, graph 200 may indicate how the magnitude of the scaling of image data varies across the width of the image data. Additionally, the positive side (e.g., above width axis 210) may correspond to a stretching of the image data (e.g., a positive scaling or a scaling up of the image data as represented by scalings 230, 240 and 250), whereas the negative side (e.g., below width axis 210) may correspond to a squeezing of the image data (e.g., a negative scaling or a scaling down of the image data as represented, for example, by scalings 430, 440 and 450 of FIG. 4).

As shown in FIG. 2, scaling 230 may represent a linear scaling of image data (e.g., 110), where the magnitude of the scaling associated with point 232 is approximately the same as the magnitude of the scaling associated with point 234. Scaling 240 may represent a parabolic scaling of image data (e.g., 110), where the magnitude of the scaling associated with point 242 is less than the magnitude of the scaling associated with point 244. As such, the portion of the image data associated with point 242 may be less stretched than the portion of the image associated with point 244. Additionally, the magnitude of scaling 240 toward the center of the image data may be approximately zero (e.g., no scaling of the center of the image data), whereas the magnitude of scaling 240 toward the sides of the image data may be significantly higher (e.g., with an increased or maximum scaling of the sides of the image data).

Scaling 250 may represent a scaling of the image data (e.g., 110) associated with another function, where the magnitude of the scaling associated with point 252 is less than the magnitude of the scaling associated with point 254. As such, the portion of the image data associated with point 252 may be less stretched than the portion of the image data associated with point 254. Additionally, the magnitude of scaling 250 toward the center of the image data may be greater than zero (e.g., with a non-zero scaling of the center of the image data), whereas the magnitude of scaling 250 toward the sides of the image data may be larger than that of the center of the image data. Further, the function associated with scaling 250 may be a non-linear parametric function and a non-parabolic parametric function in one embodiment.

In one embodiment, points 232, 242 and 252 may correspond to a first portion of image data (e.g., 126), while points 234, 244 and 254 may correspond to a second portion of image data (e.g., 128). In this manner, changing the type of scaling used to convert an aspect ratio of image data (e.g., 110) may change the magnitude of the scaling of one or more portions of the image data (e.g., 120). For example, changing from a linear scaling (e.g., 230) to a scaling associated with another function (e.g., 250) may change the magnitude of the scaling of a first portion of image data (e.g., 126 of image data 120) from a magnitude associated with point 232 to a magnitude associated with point 252. Similarly, changing from a linear scaling (e.g., 230) to a scaling associated with another function (e.g., 250) may change the magnitude of the scaling of a second portion of image data (e.g., 128 of image data 120) from a magnitude associated with point 234 to a magnitude associated with point 254.

As shown in FIG. 2, one or more of scalings 230, 240 and 250 may be implemented using a parametric function with a single parameter, where variation of the parameter may vary the scaling of the image data (e.g., 120). In one embodiment, the parametric function may be represented by the following equation:

$$x_i = (1-\alpha) \times x_o^3 + \alpha \times x_0$$

The term $x_i$ may be associated with a pixel location of initial or source image data (e.g., 110) and the term $x_o$ may be associated with a pixel location of scaled or destination image data (e.g., 120). The term $\alpha$ may be a single parameter which can be varied to vary the scaling of the image data (e.g., 110).

In one embodiment, setting α to a variable scaling value associated with a linear scaling (e.g., α=1) may implement a linear scaling (e.g., 230) of image data (e.g., 110). Alternatively, setting α to a variable scaling value associated with a parabolic scaling (e.g., setting a to a value which causes little or no scaling toward the center of the image data and a significantly increased scaling towards the sides of the image data) may implement a parabolic scaling (e.g., 250) of the image data (e.g., 110). For example, setting α=K, where K is the ratio of the aspect ratio of the initial image data (e.g., 110) to the aspect ratio of the scaled image data (e.g., 120), may implement a parabolic scaling (e.g., 250) of the image data (e.g., 110). The aspect ratio of the initial image data (e.g., 110) may be predetermined, determined from the initial image data itself (e.g., encoded within a data stream including image data 110), etc. The aspect ratio of the scaled image data (e.g., 120) may be predetermined, determined based upon an entire display area (e.g., 310) of a display device (e.g., 300 of FIG. 3) for rendering the image data, determined based upon a display area portion (e.g., 320, 330, etc. of FIG. 3) of a display device (e.g., 300 of FIG. 3), etc.

In one embodiment, the term α may be set to another variable scaling value to implement a scaling (e.g., of image data 110) associated with another function (e.g., 240). For example, setting a to a value between 1 and K, where K is the ratio of the aspect ratio of the initial image data (e.g., 110) to the aspect ratio of the scaled image data (e.g., 120), may implement a scaling associated with another function (e.g., 240). The scaling associated with another function may be a continuously-variable scaling which varies in a substantially continuous manner across the image data (e.g., without sharp steps in the scaling magnitude and/or noticeable boundaries in the rendered image data between portions of the rendered image with different scaling magnitudes). The aspect ratio of the scaled image data (e.g., 120) may be predetermined, determined based upon an entire display area (e.g., 310) of a display device (e.g., 300 of FIG. 3) for rendering the image data, determined based upon a display area portion (e.g., 320, 330, etc. of FIG. 3) of a display device (e.g., 300 of FIG. 3), etc.

As shown in FIG. 1, selector 150 may be used to vary or select a variable scaling value for α. For example, position 152 of selector 150 may be associated with a variable scaling value for implementing a linear scaling of the image data using the above parametric function. Position 154 of selector 150 may be associated with a variable scaling value for implementing a parabolic scaling of the image data using the above parametric function. Position 156 of selector 150 may be associated with a variable scaling value for implementing a scaling (e.g., associated with another function) of the image data using the above parametric function. In this manner, a variable scaling value associated with a user-selected position (e.g., 152, 154, 156, another position of selector 150, etc.) of selector 150 may be used to vary the scaling of the image data.

The scaling of the image data (e.g., 110) may be selected before presentation of the content and/or selected during presentation of the content (e.g., varied on-the-fly or in real-time). In this manner, a user may change the scaling of the image data while viewing the content associated with the image data, thereby enabling a user to detect objectionable distortion of an image (e.g., displayed by rendering image data 120) and reduce the objectionable distortion using a GUI (e.g., 140).

In one embodiment, the scaling of the image data may be based upon a variable scaling value which is automatically determined. For example, a variable scaling value may be automatically determined which reduces the scaling of a portion of the image data associated with important content. The variable scaling value may be determined before presentation of the content and/or determined during presentation of the content (e.g., varied on-the-fly or in real-time). As such, the scaling of the image data may be dynamically varied to automatically reduce the distortion of an image (e.g., displayed by rendering the image data) during presentation of the content.

In one embodiment, the scaling of the image data may be determined based upon a face detected in a portion of the image data (e.g., using a commercially-available face detection algorithm). For example, if a face is detected in a portion of the image data, then a scaling of the image data may be determined (e.g., a variable scaling value for implementing the scaling) which reduces distortion of a portion of the image (e.g., displayed by rendering the image data) which corresponds to the portion of the image data. In this manner, the scaling of the image data may be dynamically varied based upon face detection data to automatically reduce the distortion of the image (e.g., of the portion of the image including the face) during presentation of the content.

Further, in one embodiment, the automatically determined variable scaling value may be used in combination with a user-selected variable scaling value (e.g., selected using GUI 140) to scale the image data. For example, the automatically-determined value and the user-input value may be averaged or otherwise used to determine a resultant variable scaling value for scaling the image data. In another embodiment, a user-input variable scaling value may act as a constraint on the automatically-determined variable scaling value (e.g., where the resultant variable scaling value is selected within a range corresponding to the user-selected variable scaling value), thereby allowing the user to indicate a preferred scaling for the image data while also using computer-implemented algorithms to reduce distortion of the image (e.g., displayed by rendering the image data).

Figure 3A:
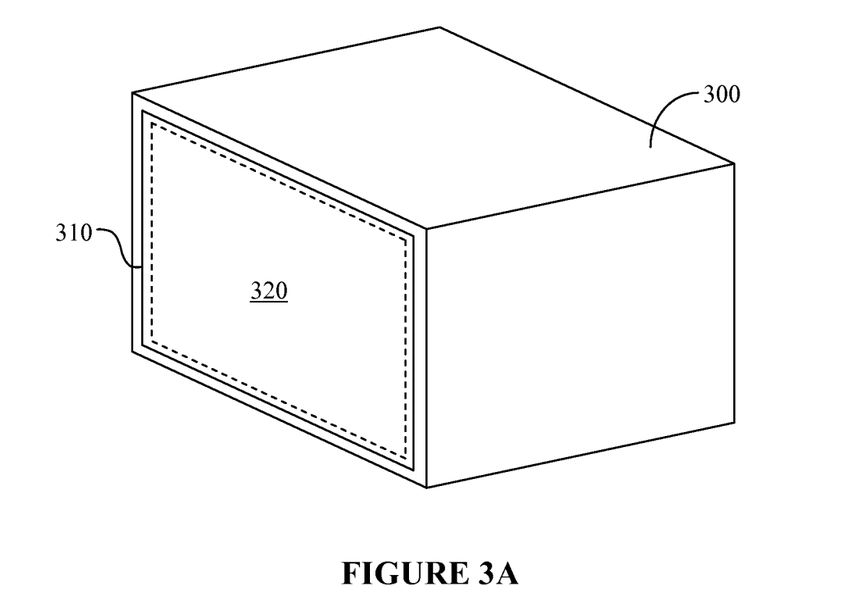
FIG. 3A shows an exemplary display device with a relatively larger display area portion for rendering image data in accordance with one embodiment of the present invention.
Figure 3B:
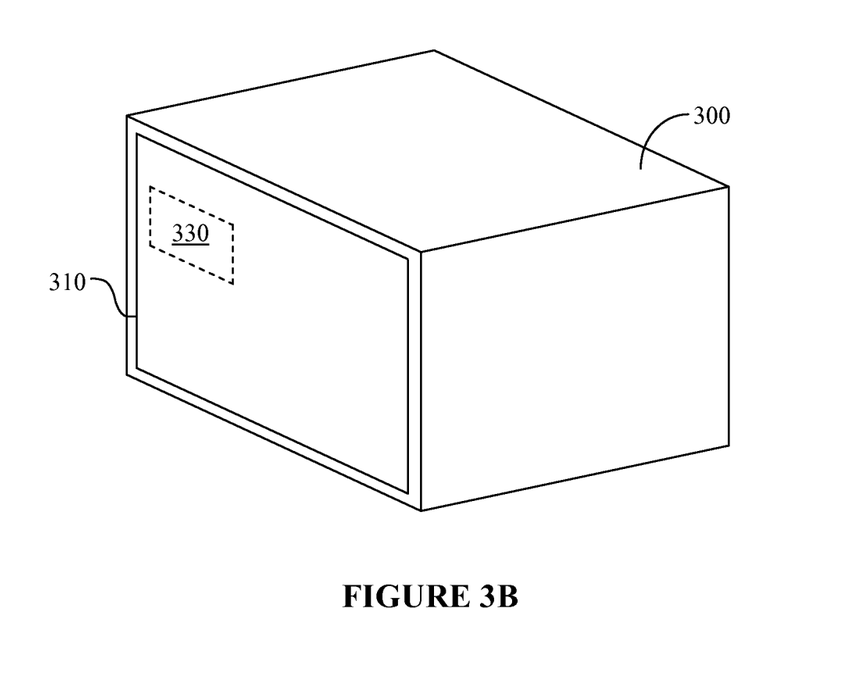
FIG. 3B shows an exemplary display device with a relatively small display area portion for rendering image data in accordance with one embodiment of the present invention.

FIG. 3A shows exemplary display device 300 with a relatively larger display area portion for rendering image data in accordance with one embodiment of the present invention, whereas FIG. 3B shows exemplary display device 300 with a relatively small display area portion for rendering image data in accordance with one embodiment of the present invention. As shown in FIGS. 3A and 3B, display device 300 includes display area 310 for presenting images (e.g., generated by a rendering of respective image data such as image data 120). Display device 300 may include a cathode ray tube (CRT) display, a liquid crystal display (LCD), light emitting diode (LED) display, organic light emitting diode (OLED) display, plasma display, etc. Further, display device 300 may be a computer-controlled display device (e.g., a computer monitor) capable of displaying computer-generated images in one embodiment.

As shown in FIG. 3A, images may be displayed (e.g., by rendering image data 120) within display area portion 320 of display area 310. Display area portion 320 may occupy all or substantially all of display area 310.

As shown in FIG. 3B, images may be displayed (e.g., by rendering image data 120) within display area portion 330 of display area 310. Display area portion 330 may occupy less than all or a relatively small portion of display area 310.

In this manner, embodiments of the present invention may be used to implement variable scaling of image data for altering the presentation of an image (e.g., displayed by rendering the scaled image data) on a display device. For example, a user may view an image (displayed by rendering image data 120), and in response thereto, scale the image data (e.g., using GUI 140) to reduce objectionable distortion of the displayed image (e.g., displayed in display area portion 320, 330, etc.). The variable scaling of the image data may be implemented using a parametric equation with a single parameter, where the single parameter is varied in accordance with a variable scaling value selected by a user (e.g., using GUI 140). It should be appreciated that the GUI for implementing the variable scaling of the image data may also be displayed within display area 310 (e.g., along with the image generated by rendering the scaled image data).

Alternatively, the variable scaling value for displaying the image (e.g., displayed within portion 320, 330, etc.) may be automatically determined. For example, a variable scaling value may be automatically determined based upon the content of the image data (e.g., a face in the image using a commercially-available face detection algorithm). The variable scaling of the image data may be implemented using a parametric equation with a single parameter, where the single parameter is varied in accordance with the automatically-determined variable scaling value.

In one embodiment, display area portion 320 and/or display area portion 330 may correspond to a window displayed within display area 310. The window and its corresponding display area portion (e.g., 320, 330, etc.) may be automatically resized, resized based upon a user interaction with the window (e.g., using a mouse and/or an on-screen cursor to change the size of the window), or the like. Additionally, the dimensions of the display area portion (e.g., 320, 330, etc.) may be used to automatically determine the destination aspect ratio for use in converting the aspect ratio of image data (e.g., 110), thereby enabling a user to select or control the destination aspect ratio by changing the size of a window or display area portion used to render image data (e.g., 120).

Further, in one embodiment, display area portions 320 and 330 may overlap, thereby enabling images to be simultaneously displayed within display area portions 320 and 330 for implementing a picture-in-picture (PIP) display. Accordingly, in one embodiment, the variable scaling of more than one set of image data (e.g., used to render images displayed within display area portions 320 and 330) may be varied by a user (e.g., using a respective GUI similar to GUI 140 for each image, using a single GUI similar to GUI 140 for all images, etc.) and/or varied automatically (e.g., by a computer-implemented algorithm based upon the content of the images).

Although FIG. 1 shows an aspect ratio conversion of 4:3 to 16:9, it should be appreciated that embodiments of the present invention may be used with or used to implement other aspect ratio conversions involving stretching the image data (e.g., 4:3 to 2.35:1, 16:9 to 2.35:1, etc.). Additionally, although FIG. 1 shows an aspect ratio conversion of 4:3 to 16:9, it should be appreciated that embodiments of the present invention may be used with or used to implement other aspect ratio conversions involving squeezing the image data (e.g., 16:9 to 4:3, 2.35:1 to 16:9, 2.35:1 to 4:3, etc.).

Additionally, although FIG. 1 shows GUI 140 with specific user-selectable graphical user elements (e.g., positions of selector 150), it should be appreciated that other GUI elements may be used in other embodiments. For example, the scaling of the image data may be varied using a menu (e.g., where a scaling to be implemented may be selected from the menu), a user-modifiable field (e.g., where a scaling to be implemented may be entered into the field), etc.

Figure 4:
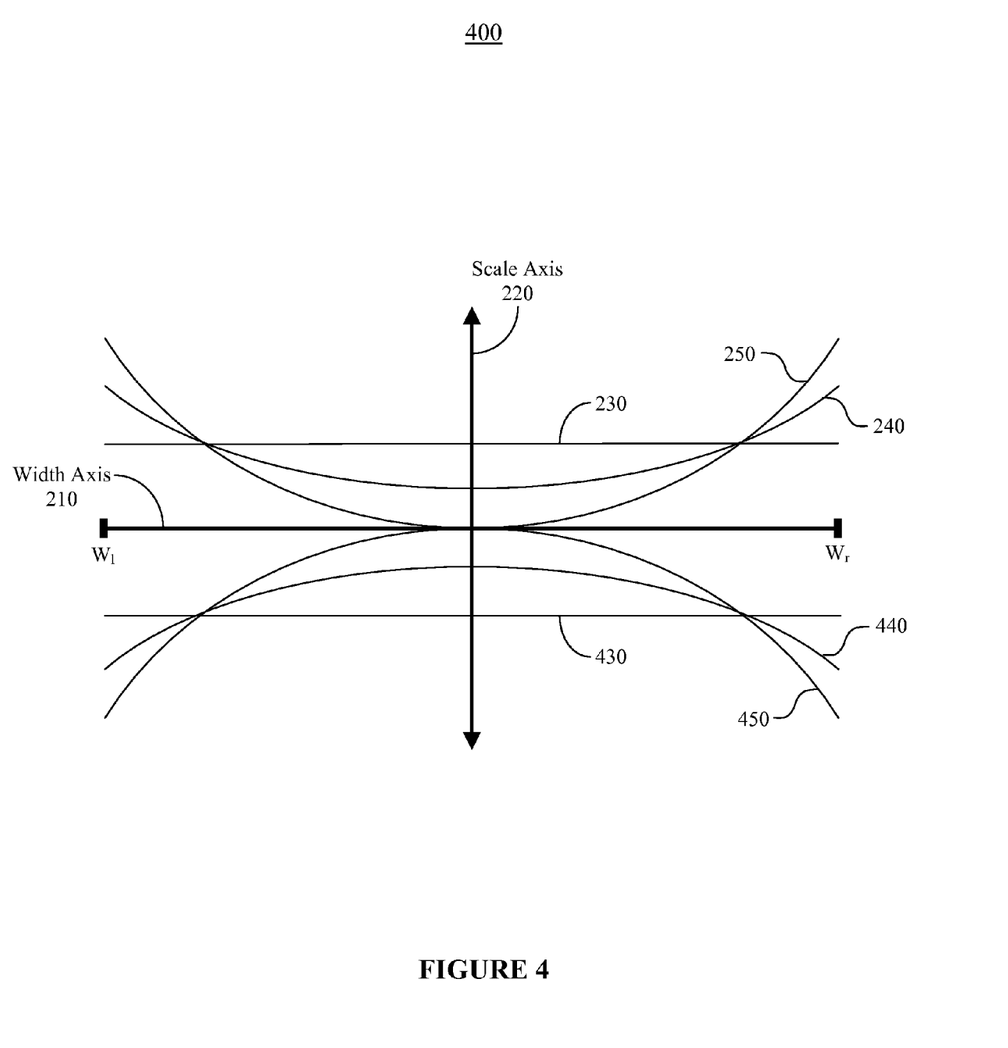
FIG. 4 shows an exemplary graph of positive scalings and negative scalings in accordance with one embodiment of the present invention.

Further, although FIG. 2 is associated with a positive scaling (e.g., stretching) of image data (e.g., 120), it should be appreciated that graph 200 may include one or more scalings for implementing a negative scaling (e.g., squeezing) of the image data in other embodiments. For example, FIG. 4 shows exemplary graph 400 of positive scalings and negative scalings in accordance with one embodiment of the present invention. As shown in FIG. 4, graph 400 includes positive scalings 230, 240 and 250, where each of the positive scalings may be associated with a stretching of initial image data (e.g., 110). Graph 400 also includes negative scalings 430, 440 and 450, where each of the negative scalings may be associated with a squeezing of initial image data (e.g., 110).

As shown in FIG. 4, each of the negative scalings (e.g., 430, 440 and 450) may be related by a parametric equation with a single parameter (e.g., similar to the equation for the positive scalings discussed above). In this manner, the single parameter of the parametric equation may be varied (e.g., using a variable scaling value of opposite sign as that used to implement a positive scaling of the image) to vary the negative scaling of the image data by selecting a negative scaling (e.g., 430, 440, 450, etc.) for use in scaling the image data (e.g., 110).

A GUI (e.g., 140) may be used to select or vary the negative scaling of the image data (e.g., 110) in one embodiment. For example, selection or movement of selector 150 to position 152 may implement a linear scaling (e.g., 430 of FIG. 4) of image data (e.g., 110), where position 152 may be a user-selectable graphical object or GUI element associated with a linear scaling (e.g., 430). Selection or movement of selector 150 to position 154 may implement a parabolic scaling (e.g., 440 of FIG. 4) of image data (e.g., 110), where position 154 may be a user-selectable graphical object or GUI element associated with a parabolic scaling (e.g., 440). Selection or movement of selector 150 to another position (e.g., 156, another position between positions 152 and 154, etc.) may implement a scaling associated with another function (e.g., 450 of FIG. 4), where position 156 may be a user-selectable graphical object or GUI element associated with a scaling associated with another function (e.g., 450).

Figure 5:
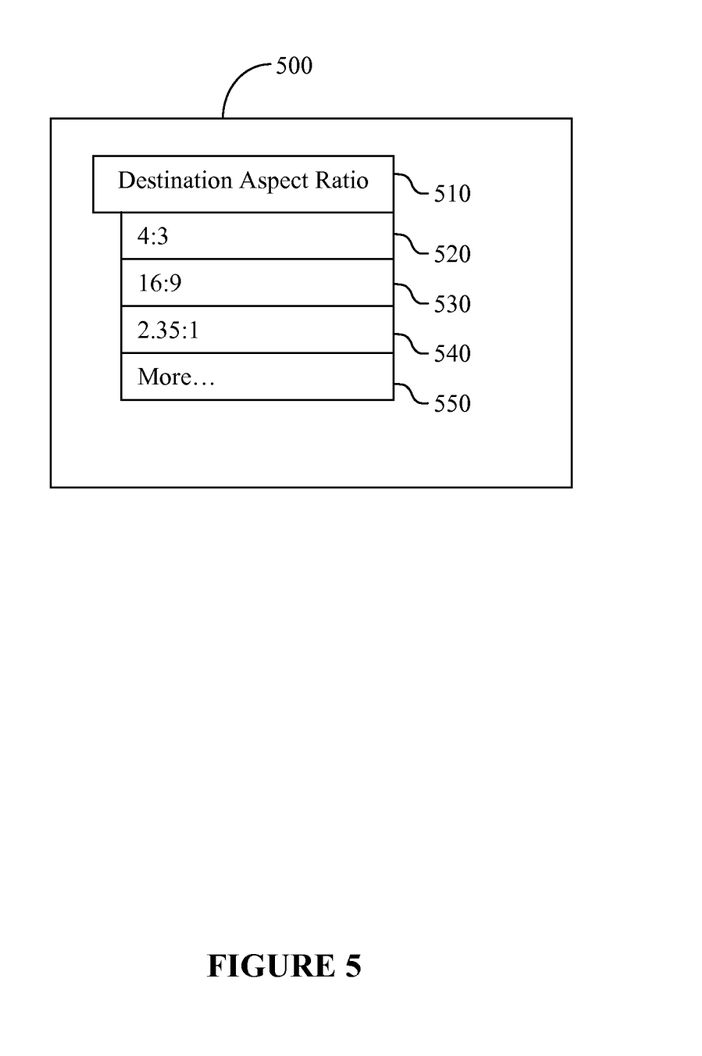
FIG. 5 shows an exemplary on-screen graphical user interface for selecting a destination aspect ratio for scaled image data in accordance with one embodiment of the present invention.

FIG. 5 shows exemplary on-screen graphical user interface 500 for selecting a destination aspect ratio for scaled image data in accordance with one embodiment of the present invention. As shown in FIG. 5, GUI 500 includes menu (e.g., drop-down menu) 510 with a plurality of selectable menu elements 520-550. Menu elements 520-550 are each associated with a respective aspect ratio, where interaction with one of menu elements 520-550 may select an aspect ratio (e.g., associated with the selected menu element) as the destination aspect ratio for image 120. Additionally, interaction with menu element 550 may imitate the display of additional menu elements (e.g., similar to menu elements 520-540 and associated with aspect ratios other than those corresponding to menu elements 520-540), where the initial menu elements may be displayed below menu element 540 in one embodiment.

In one embodiment, GUI 500 may be used to select a destination aspect ratio for image data (e.g., 120) rendered within a display area portion (e.g., 330) of a display device (e.g., 300). In this manner, less than the entire viewable area (e.g., 310) may be used to display the image data (e.g., 120). As such, in one embodiment, the destination aspect ratio (e.g., selected using GUI 500) associated with the image data (e.g., 120) may be different than the aspect ratio associated with the display device (e.g., 300) and/or the entire viewable area (e.g., 310) of the display device (e.g., 300).

Additionally, GUI 500 may be used to change the functionality of a GUI (e.g., 140) for varying the scale of image data (e.g., 120) in one embodiment. For example, if a destination aspect ratio larger than the source aspect ratio is selected using GUI 500, then GUI 140 may be used to implement a positive scaling (e.g., 230, 240, 250, etc.) of the image data (e.g., 110). Alternatively, if a destination aspect ratio smaller than the source aspect ratio is selected using GUI 500, then GUI 140 may be used to implement a negative scaling (e.g., 430, 440, 450, etc.) of the image data (e.g., 110).

GUI 500 may also change the functionality of GUI 140 by changing the variable scaling values associated with each position of selector 150. For example, where position 152 (e.g., for implementing a linear scaling) is associated with a variable scaling value of 1, position 154 (e.g., for implementing a parabolic scaling) is associated with a variable scaling value of K, and positions in between 152 and 154 (e.g., for implementing a scaling associated with another function) are associated with variable scaling values between 1 and K, then a change in the destination aspect ratio (e.g., using GUI 500) will change the respective variable scaling values associated with all positions except for position 152 where K is a function of the destination aspect ratio. In one embodiment, position 154 will be associated with a variable scaling value equal to the new value of K (e.g., calculated by dividing the source aspect ratio associated with image data 110 by the new destination aspect ratio of image data 120 selected using GUI 500), and positions in between positions 152 and 154 will be associated with respective variable scaling values based on an interpolation of 1 and the new value of K. In this manner, GUI 500 may be used to select a destination aspect ratio for image 120 and also enable GUI 140 to vary the scaling of the source image (e.g., 110) for use in converting the aspect ratio of the source image (e.g., 120).

Although FIG. 5 shows one mechanism for selecting a destination aspect ratio for image 120, it should be appreciated that the destination aspect ratio for image data 120 may be selected in other ways. For example, GUI 500 may include a user-modifiable field for enabling a user to enter a destination aspect ratio.

Alternatively, the destination aspect ratio for image data 120 may be automatically determined based upon the dimensions of a window or other display area portion (e.g., 330) for displaying the image data (e.g., 120). For example, if a user changes the aspect ratio of the window or display area portion to 16:9, then the destination aspect ratio of image 120 may be automatically set to 16:9 for display in that window or display area portion. Further, the functionality of GUI 140 may be automatically changed in response to a user's resizing of the window or display area portion (e.g., for rendering image data 120). For example, where the destination aspect ratio is changed to 16:9 by a user's resizing of the window or display area portion, then selector 150 of GUI 140 may be reconfigured for a 16:9 destination aspect ratio (e.g., the respective variable scaling values associated with positions of selector 150 may be changed to reflect the new value of K determined based upon the new destination aspect ratio) to enable a user to vary the scaling of the image data 120 (e.g., now with a new destination aspect ratio) rendered in the window or display area portion.

Figure 6:
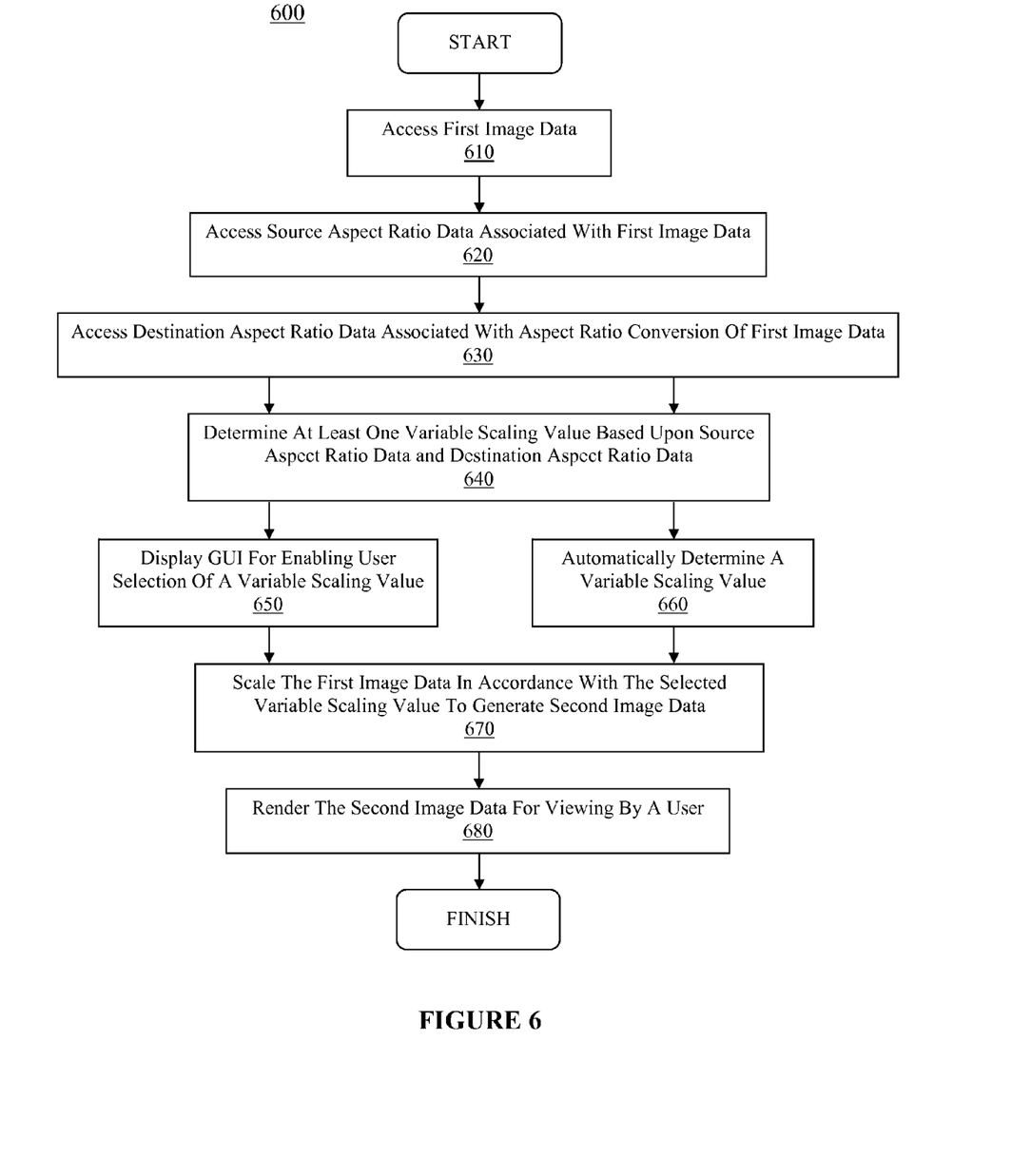
FIG. 6 shows a flowchart of an exemplary computer-implemented process for scaling image data in accordance with one embodiment of the present invention.

FIG. 6 shows a flowchart of exemplary computer-implemented process 600 for scaling image data in accordance with one embodiment of the present invention. As shown in FIG. 6, step 610 involves accessing first image data (e.g., 110). The first image data may be any data which may be rendered for viewing by a user. For example, the first image data may be a frame from a video, a portion of a frame from a video, a still image, a portion of a still image, etc.

Step 620 involves accessing source aspect ratio data associated with the first image data (e.g., 110). The source aspect ratio data may specify an aspect ratio (e.g., 4:3, 16:9, 2.35:1, etc.) of the first image data. The source aspect ratio data may be encoded within a data stream including the first image data (e.g., 110), included as part of the first image data (e.g., 110), etc.

As shown in FIG. 6, step 630 involves accessing destination aspect ratio data associated with aspect ratio conversion of the first image data (e.g., 110). The destination aspect ratio data may specify an aspect ratio (e.g., 4:3, 16:9, 2.35:1, etc.) of second image data (e.g., 120) generated as a result of scaling and/or aspect ratio conversion of the first image data (e.g., 110). Additionally, the destination aspect ratio data may be specified by a user (e.g., using GUI 500, etc.) and/or determined automatically in response to a user input (e.g., based upon an aspect ratio of a window or display area portion used to render the image data). In one embodiment, the destination aspect ratio may be determined by the aspect ratio of an entire display area (e.g., 310) of a display device (e.g., 300).

Step 640 involves determining at least one variable scaling value based upon the source aspect ratio data (e.g., accessed in step 620) and the destination aspect ratio data (e.g., accessed in step 630). In one embodiment, a variable scaling value of for implementing a parabolic scaling (e.g., with no or very little scaling toward the center of the image data and significantly increased scaling toward the sides of the image data) may be calculated (e.g., by dividing the source aspect ratio by the destination aspect ratio), where this parabolic variable scaling value is then used to determine other variable scaling values for implementing variable scalings associated with other parametric functions. For example, the other variable scaling values may be determined by interpolating between a variable scaling value for implementing a linear scaling (e.g., 1, −1, etc.) and the parabolic variable scaling value. It should be appreciated that the parabolic variable scaling value and/or other variable scaling values calculated in step 640 may change for different aspect ratio conversions of the image data (e.g., where the source aspect ratio and/or destination aspect ratio is changed).

Step 650 involves displaying a GUI for enabling a user to select a variable scaling value (e.g., determined or calculated in step 640) for varying the scaling of the image data (e.g., 110). The GUI (e.g., 140) may include a selector (e.g., 150) with a plurality of selectable positions or user-selectable elements, where each position may be associated with a respective variable scaling value for varying the scaling of the image data (e.g., 110). Additionally, in one embodiment, a first position (e.g., 152) at one end of the selector (e.g., 150) may be associated with a variable scaling value for implementing a linear scaling (e.g., 230, 430, etc.) of the image data (e.g., 110), a second position (e.g., 154) at the other end of the selector (e.g., 150) may be associated with a variable scaling value for implementing a parabolic scaling (e.g., 240, 440, etc.) of the image data (e.g., 110), and positions (e.g., 156, etc.) in between the first and second positions may be associated with respective variable scaling values for implementing scalings associated with other functions (e.g., parametric functions with some scaling toward the center of the image data and increased scaling toward the sides of the image data, non-linear parametric functions, other parametric functions, etc.). Accordingly, user interaction with the selector (e.g., moving selector 150 to a position) may enable selection of a variable selection value (e.g., a variable scaling value corresponding to the selected position) for use in scaling the image data (e.g., 110).

As shown in FIG. 6, step 660 involves automatically determining a variable scaling value. The variable scaling value may be automatically determined using information from a computer-implemented algorithm (e.g., a face detection algorithm) which indicates one or more portions of the image data (e.g., 110, 120, etc.) which include important content or other content which may benefit from distortion reduction (e.g., a face, a person, etc.), where the selected variable scaling value may be used to reduce distortion of the one or more portions of an image generated from the image data (e.g., 120).

Step 670 involves scaling the first image data (e.g., 110) in accordance with the selected variable scaling value to generate second image data (e.g., 120). The variable scaling value used in step 670 may be a variable scaling value selected in step 650 (e.g., selected by a user of a GUI), a variable scaling value determined automatically in step 660, or some combination thereof (e.g., an average of a user-selected variable scaling value and an automatically-determined variable scaling value). The scaling in step 670 may be a linear scaling (e.g., 230, 430, etc.) of the image data, a parabolic scaling (e.g., 250, 450, etc.) of the image data, or a scaling associated with another function (e.g., 240, 440, etc.). Additionally, the scaling of the first image data in step 670 may be implemented using a parametric function with a single parameter, where the parameter is set to the selected variable scaling value.

In one embodiment, the parametric function used to scale the image data in step 670 may be represented by the following equation:

$$x_i = (1-\alpha) \times x_o^3 + \alpha \times x_0$$

The term $x_i$ may be associated with a pixel location of initial or source image data (e.g., 110) and the term $x_o$ may be associated with a pixel location of scaled or destination image data (e.g., 120). The term $\alpha$ may be a single parameter which can be varied (e.g., by setting it to a variable scaling value selected in step 650, step 660, some combination thereof, etc.) to vary the scaling of the image data (e.g., 110).

As shown in FIG. 6, step 680 involves rendering the second image data (e.g., 120) for viewing by a user. The second image data may be displayed on a computer-controlled display device (e.g., 300 of FIGS. 3A and 3B), where the second image occupies all or substantially all of the viewing area (e.g., 310) of the display device (e.g., represented by display area portion 320 of FIG. 3A), occupies a portion of the viewing area (e.g., 310) of the display device (e.g., represented by display area portion 330 of FIG. 3B), or some combination thereof (e.g., the second image data is part of a picture-in-picture display where the scaling of at least one of the overlapping images is controlled by a GUI such as GUI 140).

Figure 7:
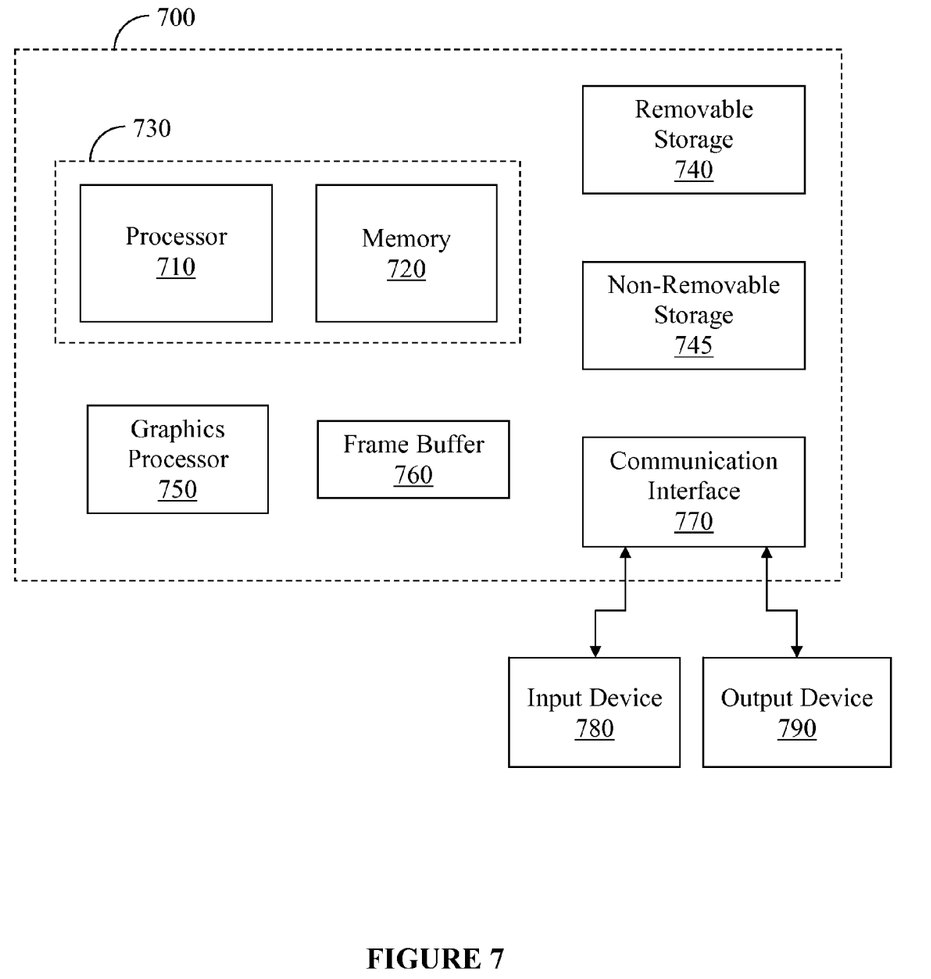
FIG. 7 shows an exemplary computer system platform upon which embodiments of the present invention may be implemented.

FIG. 7 shows exemplary general purpose computer system platform 700 upon which embodiments of the present invention may be implemented. As shown in FIG. 7, portions of the present invention are comprised of computer-readable and computer-executable instructions that reside, for example, in computer system platform 700 and which may be used as a part of a general purpose computer network (not shown). It is appreciated that computer system platform 700 of FIG. 7 is merely exemplary. As such, the present invention can operate within a number of different systems including, but not limited to, general-purpose computer systems, embedded computer systems, laptop computer systems, hand-held computer systems, portable computer systems, and stand-alone computer systems, for instance.

In one embodiment, depicted by dashed lines 730, computer system platform 700 may comprise at least one processor 710 and at least one memory 720. Processor 710 may comprise a central processing unit (CPU) or other type of processor. Depending on the configuration and/or type of computer system environment, memory 720 may comprise volatile memory (e.g., RAM), non-volatile memory (e.g., ROM, flash memory, etc.), or some combination of the two. Additionally, memory 720 may be removable, non-removable, etc.

In other embodiments, computer system platform 700 may comprise additional storage (e.g., removable storage 740, non-removable storage 745, etc.). Removable storage 740 and/or non-removable storage 745 may comprise volatile memory, non-volatile memory, or any combination thereof. Additionally, removable storage 740 and/or non-removable storage 745 may comprise CD-ROM, digital versatile disks (DVD) or other optical storage, magnetic cassettes, magnetic tape, magnetic disk storage or other magnetic storage devices, or any other medium which can be used to store information for access by computer system platform 700.

As shown in FIG. 7, computer system platform 700 may communicate with other systems, components, or devices via communication interface 770. Communication interface 770 may embody computer readable instructions, data structures, program modules or other data in a modulated data signal (e.g., a carrier wave) or other transport mechanism. By way of example, and not limitation, communication interface 770 may couple to wired media (e.g., a wired network, direct-wired connection, etc.) and/or wireless media (e.g., a wireless network, a wireless connection utilizing acoustic, RF, infra-red, or other wireless signaling, etc.).

Communication interface 770 may also couple computer system platform 700 to one or more input devices (e.g., 780), where the one or more input devices may include a keyboard, a mouse, a pen, a voice input device, a touch input device, etc. Additionally, communication interface 770 may couple computer system platform 700 to one or more output devices (e.g., 790), where the one or more output devices may include a display (e.g., 300), a speaker, a printer, etc.

In one embodiment, communications interface 770 may include a tuner component capable of decoding and/or encoding data. For example, video data received from another source (e.g., a cable provider, a satellite provider, etc.) may be decoded by the tuner component and communicated to an output device (e.g., 790) for display thereon.

As shown in FIG. 7, graphics processor 750 may perform graphics processing operations on graphical data stored in frame buffer 760 or another memory (e.g., 720, 740, 745, etc.) of computer system platform 700. Graphical data stored in frame buffer 760 may be accessed, processed, and/or modified by components (e.g., graphics processor 750, processor 710, etc.) of computer system platform 700 and/or components of other systems/devices. Additionally, the graphical data may be accessed (e.g., by graphics processor 750) and displayed on an output device coupled to computer system platform 700. Accordingly, memory 720, removable storage 740, non-removable storage 745, fame buffer 760, or a combination thereof, may comprise instructions that when executed on a processor (e.g., 710, 750, etc.) implement a method of scaling image data (e.g., in accordance with process 600 of FIG. 6).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of scaling image data, said method comprising:

displaying on a display screen a graphical user interface for enabling a user to select a selected variable scaling value from a plurality of variable scaling values, said selected variable scaling value for scaling first image data;

in response to a user selection of said selected variable scaling value using said graphical user interface, scaling said first image data based on an average of said selected variable scaling value and an automatically determined variable scaling value to generate second image data; and rendering said second image data on said display screen, wherein at least one variable scaling value of said plurality of variable scaling values is based on a source aspect ratio data associated with said first image data and a destination aspect ratio data, wherein said scaling said first image data comprises scaling a first portion of a frame of said first image data using a first scale and a second portion of said frame of said first image data using a second scale not equal to said first scale, said first and second scales being functions of said selected variable scaling value, further wherein, said selected variable scaling value acts as a constraint on said automatically determined variable scaling value.

2. The method of claim 1, wherein said scaling said first image data further comprises generating said second image data using a parametric function, said parametric function relating said first image data and said second image data with a single parameter, and wherein said single parameter is set equal to said selected variable scaling value.

3. The method of claim 1, wherein said first and second scales are related by a function other than a line.

4. The method of claim 1 further comprising:
determining said plurality of variable scaling values based upon a first aspect ratio associated with said first image data and a second aspect ratio associated with said second image data.

5. The method of claim 4, wherein said second aspect ratio associated with said second image data is associated with a user interaction selected from a group consisting of a user selection of said second aspect ratio and an aspect ratio of a display area portion for rendering said second image data.

6. The method of claim 1, wherein said first image data is associated with a first aspect ratio, wherein said second image data is associated with a second aspect ratio, and wherein said first and second aspect ratios are different.

7. The method of claim 1, wherein said graphical user interface comprises a selector image with a plurality of positions, wherein each of said plurality of positions corresponds to a respective variable scaling value of said plurality of variable scaling values, and wherein said user selection of said selected variable scaling value comprises a movement of said selector image to a position of said plurality of positions corresponding to said selected variable scaling value.

8. The method of claim 1, wherein said scaling comprises continuously-variable scaling that varies across the image data.

9. The method of claim 1, wherein said scaling of said first image data is based upon a face detected in said first portion of said image data.

10. The method of claim 1, wherein said source aspect ratio is encoded within a data stream comprising the first image data.

11. The method of claim 1, wherein said destination aspect ratio data specifies an aspect ratio of said second image data.

12. The method of claim 1, wherein said destination aspect ratio is generated by scaling said first image data.

13. The method of claim 1, wherein said destination aspect ratio is specified by said user.

14. The method of claim 1, wherein said destination aspect ratio is determined automatically based on an aspect ratio of a portion of said display screen.

15. The method of claim 1, wherein said destination aspect ratio is determined based on an aspect ratio of an entirety of said display screen.

16. The method of claim 1, wherein said variable scaling value is based on a detection of a face in a portion of said first image data.

17. A non-transitory computer-usable medium having computer-readable program code that when executed by a processor causes a computer system to perform a method of scaling image data, said method comprising:

displaying on a display screen a graphical user interface for enabling a user to select a selected variable scaling value from a plurality of variable scaling values, said selected variable scaling value for scaling first image data;

in response to a user selection of said selected variable scaling value using said graphical user interface, scaling said first image data based on an average of said selected variable scaling value and an automatically determined variable scaling value to generate second image data; and rendering said second image data on said display screen, wherein at least one variable scaling value of said plurality of variable scaling values is based on a source aspect ratio data associated with said first image data and a destination aspect ratio data, wherein said scaling said first image data comprises scaling a first portion of a frame of said first image data using a first scale and a second portion of said frame of said first image data using a second scale not equal to said first scale, said first and second scales being functions of said selected variable scaling value, further wherein, said selected variable scaling value acts as a constraint on said automatically determined variable scaling value.

18. The computer-usable medium of claim 17, wherein said scaling said first image data further comprises generating said second image data using a parametric function, said parametric function relating said first image data and said second image data with a single parameter, and wherein said single parameter is set equal to said selected variable scaling value.

19. The computer-usable medium of claim 17, wherein said first and second scales are related by a function other than a line.

20. The computer-usable medium of claim 17, wherein said method further comprises:
determining said plurality of variable scaling values based upon a first aspect ratio associated with said first image data and a second aspect ratio associated with said second image data.

21. The computer-usable medium of claim 20, wherein said second aspect ratio associated with said second image data is associated with a user interaction selected from a group consisting of a user selection of said second aspect ratio and an aspect ratio of a display area portion for rendering said second image data.

22. The computer-usable medium of claim 17, wherein said first image data is associated with a first aspect ratio, wherein said second image data is associated with a second aspect ratio, and wherein said first and second aspect ratios are different.

23. The computer-usable medium of claim 17, wherein said graphical user interface comprises a selector image with a plurality of positions, wherein each of said plurality of positions corresponds to a respective variable scaling value of said plurality of variable scaling values, and wherein said user selection of said selected variable scaling value comprises a movement of said selector image to a position of said plurality of positions corresponding to said selected variable scaling value.

24. A non-transitory computer-usable medium having computer-readable program code that when executed by a processor of a computer system, implements a graphical user interface for enabling variable scaling of image data, said graphical user interface comprising:
a plurality of user-selectable graphical objects, wherein each of said plurality of user-selectable graphical objects is associated with a respective variable scaling value for scaling first image data, said first image data for display on a display screen, and wherein said first image data comprises a first portion of a frame of said first image data and a second portion of a frame of said first image data; and
wherein a user selection of a selected user-selectable graphical object from said plurality of user-selectable graphical objects is operable to initiate a scaling of said first image data to generate second image data, wherein said scaling of said first image data is performed in accordance with an average of a selected variable scaling value associated with said selected user-selectable graphical object and an automatically determined variable scaling value,
wherein at least one variable scaling value associated with a user-selectable graphical object of said plurality of user-selectable graphical objects is based on a source aspect ratio data corresponding to said first image data and a destination aspect ratio data,
wherein said scaling said first image data comprises scaling a first portion of a frame of said first image data using a first scale and a second portion of said frame of said first image data using a second scale not equal to said first scale, said first and second scales being functions of said selected variable scaling value,
further wherein, said selected variable scaling value acts as a constraint on said automatically determined variable scaling value.

25. The non-transitory computer usable medium of claim 24, wherein said scaling is associated with scaling said first image data using a parametric equation, said parametric equation using said selected variable scaling value as a single parameter.

26. The non-transitory computer usable medium of claim 24, wherein said first and second scales are related by a function other than a line.

27. The non-transitory computer usable medium of claim 24, wherein said selected variable scaling value is related to a first aspect ratio associated with said first image data and a second aspect ratio associated with said second image data.

28. The non-transitory computer usable medium of claim 27, wherein said second aspect ratio associated with said second image data is associated with a user interaction selected from a group consisting of a user selection of said second aspect ratio and an aspect ratio of a display area portion for rendering said second image data.

29. The non-transitory computer usable medium of claim 24, wherein said first image data is associated with a first aspect ratio, wherein said second image data is associated with a second aspect ratio, and wherein said first and second aspect ratios are different.

30. The non-transitory computer usable medium of claim 24, wherein said scaling first image data comprises continuously-variable scaling that varies across said first image data.

* * * * *